(12) United States Patent
Rosenberg

(10) Patent No.: US 8,788,253 B2
(45) Date of Patent: Jul. 22, 2014

(54) METHODS AND APPARATUS FOR PROVIDING HAPTIC FEEDBACK IN INTERACTING WITH VIRTUAL PETS

(75) Inventor: Louis B. Rosenberg, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 1152 days.

(21) Appl. No.: 10/283,258

(22) Filed: Oct. 30, 2002

(65) Prior Publication Data

US 2003/0080987 A1 May 1, 2003

Related U.S. Application Data

(60) Provisional application No. 60/336,411, filed on Oct. 30, 2001.

(51) Int. Cl.
*G06F 17/50* (2006.01)
(52) U.S. Cl.
USPC .......................................................... 703/13
(58) Field of Classification Search
USPC .......................................... 703/6, 13; 700/245
See application file for complete search history.

(56) References Cited

U.S. PATENT DOCUMENTS

| | | | |
|---|---|---|---|
| 2,972,140 A | 2/1961 | Hirsch | |
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |
| 3,902,687 A | 9/1975 | Hightower | |
| 3,903,614 A | 9/1975 | Diamond et al. | |
| 3,911,416 A | 10/1975 | Feder | |
| 4,127,752 A | 11/1978 | Lowthorp | |
| 4,160,508 A | 7/1979 | Salisbury, Jr. | |
| 4,236,325 A | 12/1980 | Hall et al. | |
| 4,262,549 A | 4/1981 | Schwellenbach | |
| 4,320,268 A | 3/1982 | Brown | 200/5 |
| 4,321,441 A | 3/1982 | Thornburg | 200/159 |
| 4,333,070 A | 6/1982 | Barnes | |
| 4,464,117 A | 8/1984 | Foerst | |
| 4,484,191 A | 11/1984 | Vavra | |
| 4,513,235 A | 4/1985 | Acklam et al. | |
| 4,581,491 A | 4/1986 | Boothroyd | |
| 4,599,070 A | 7/1986 | Hladky et al. | |

(Continued)

FOREIGN PATENT DOCUMENTS

| | | |
|---|---|---|
| EP | 0607580 | 7/1994 |
| JP | 11-299305 | 11/1999 |
| WO | 00/35548 A1 | 6/2000 |

OTHER PUBLICATIONS

US Patent Application Publication 2002/0019678 A1.*

(Continued)

*Primary Examiner* — Hugh Jones
(74) *Attorney, Agent, or Firm* — Miles & Stockbridge P.C.

(57) ABSTRACT

Embodiments of the invention relate to methods and systems for providing haptic feedback to a user interacting with a simulated (or "virtual") pet, so as to enhance the realism of the user's relationship with the virtual pet. In one embodiment, a method of providing haptic feedback to a user interacting with a virtual pet comprises: receiving a signal relating to a biological status of the virtual pet, and outputting a haptic effect based on the received signal on a user.

16 Claims, 7 Drawing Sheets

(56) References Cited

U.S. PATENT DOCUMENTS

| | | |
|---|---|---|
| 4,708,656 A | 11/1987 | de Vries et al. |
| 4,713,007 A | 12/1987 | Alban |
| 4,791,416 A | 12/1988 | Adler |
| 4,794,392 A | 12/1988 | Selinko |
| 4,795,296 A | 1/1989 | Jau |
| 4,798,919 A | 1/1989 | Miessler et al. |
| 4,821,030 A | 4/1989 | Batson et al. |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,078,152 A | 1/1992 | Bond et al. |
| 5,165,897 A | 11/1992 | Johnson |
| 5,175,459 A | 12/1992 | Danial et al. |
| 5,182,557 A | 1/1993 | Lang |
| 5,186,695 A | 2/1993 | Mangseth et al. |
| 5,212,473 A | 5/1993 | Louis |
| 5,223,658 A | 6/1993 | Suzuki |
| 5,237,327 A | 8/1993 | Saitoh et al. |
| 5,240,417 A | 8/1993 | Smithson et al. |
| 5,246,316 A | 9/1993 | Smith |
| 5,271,290 A | 12/1993 | Fischer |
| 5,275,174 A | 1/1994 | Cook |
| 5,283,970 A | 2/1994 | Aigner |
| 5,289,273 A | 2/1994 | Lang |
| 5,299,810 A | 4/1994 | Pierce et al. |
| 5,309,140 A | 5/1994 | Everett, Jr. et al. |
| 5,334,027 A | 8/1994 | Wherlock |
| 5,355,148 A | 10/1994 | Anderson |
| 5,390,128 A | 2/1995 | Ryan et al. |
| 5,390,296 A | 2/1995 | Crandall et al. |
| 5,402,499 A | 3/1995 | Robison et al. |
| 5,436,622 A | 7/1995 | Gutman et al. |
| 5,437,607 A | 8/1995 | Taylor |
| 5,451,924 A | 9/1995 | Massimino et al. |
| 5,461,711 A | 10/1995 | Wang et al. |
| 5,466,213 A | 11/1995 | Hogan et al. |
| 5,524,195 A | 6/1996 | Clanton, III et al. |
| 5,547,382 A | 8/1996 | Yamasaki et al. |
| 5,565,840 A | 10/1996 | Thorner et al. |
| 5,575,761 A | 11/1996 | Hajianpour |
| 5,631,861 A | 5/1997 | Kramer |
| 5,669,818 A | 9/1997 | Thorner et al. |
| 5,684,722 A | 11/1997 | Thorner et al. |
| 5,690,582 A | 11/1997 | Ulrich et al. |
| 5,691,747 A | 11/1997 | Amano |
| 5,709,219 A | 1/1998 | Chen et al. |
| 5,729,249 A | 3/1998 | Yasutake |
| 5,734,373 A | 3/1998 | Rosenberg et al. |
| 5,766,016 A | 6/1998 | Sinclair et al. |
| 5,767,457 A | 6/1998 | Gerpheide et al. |
| 5,785,630 A | 7/1998 | Bobick et al. |
| 5,791,992 A | 8/1998 | Crump et al. |
| 5,844,392 A | 12/1998 | Peurach et al. |
| 5,857,986 A | 1/1999 | Moriyasu |
| 5,887,995 A | 3/1999 | Holehan |
| 5,889,670 A | 3/1999 | Schuler et al. |
| 5,889,672 A | 3/1999 | Schuler et al. |
| 5,945,772 A | 8/1999 | Macnak et al. |
| 5,956,484 A | 9/1999 | Rosenberg et al. |
| 5,988,902 A | 11/1999 | Holehan |
| 6,059,506 A | 5/2000 | Kramer |
| 6,078,126 A | 6/2000 | Rollins et al. |
| 6,097,964 A | 8/2000 | Nuovo et al. |
| 6,101,530 A | 8/2000 | Rosenberg et al. |
| 6,111,577 A | 8/2000 | Zilles et al. |
| 6,131,097 A | 10/2000 | Peurach et al. |
| 6,160,489 A | 12/2000 | Perry et al. |
| 6,167,362 A | 12/2000 | Brown et al. |
| 6,195,592 B1 | 2/2001 | Schuler et al. |
| 6,198,206 B1 | 3/2001 | Saarmaa et al. |
| 6,211,861 B1 | 4/2001 | Rosenberg et al. |
| 6,218,966 B1 | 4/2001 | Goodwin et al. |
| 6,219,034 B1 | 4/2001 | Elbing et al. |
| 6,225,976 B1 | 5/2001 | Yates et al. |
| 6,273,815 B1 | 8/2001 | Stuckman et al. |
| 6,287,193 B1 | 9/2001 | Rehkemper et al. |
| 6,290,566 B1 | 9/2001 | Gabai et al. |
| 6,374,255 B1 | 4/2002 | Peurach et al. |
| 6,422,941 B1 | 7/2002 | Thorner et al. |
| 6,429,846 B2 | 8/2002 | Rosenberg et al. |
| 6,438,457 B1 * | 8/2002 | Yokoo et al. .................. 700/245 |
| 6,543,487 B2 | 4/2003 | Bazinet |
| 6,650,338 B1 * | 11/2003 | Kolarov et al. ............... 345/619 |
| 2002/0033795 A1 | 3/2002 | Shahoian et al. |
| 2002/0128048 A1 | 9/2002 | Aaltonen |
| 2002/0177471 A1 | 11/2002 | Kaaresoja et al. |

OTHER PUBLICATIONS

L.B. Rosenberg, A Force Feedback Programming Primer, Immersion Corporation, San Jose, California, 1997; 98 pages (2-sided).*

Author not known, "Information Processing, vol. 41, No. 2 (Interface Technology Coming Close to Real World: Digital Pets—Machines with Minds)" published by the Information Processing Society of Japan, Feb. 15, 2000, vol. 41, No. 2, pp. 127-136 (with translation).

Umeki, Naoko, et al., "A Motional Interface by Using Motion Processor," Human Interface Society, Feb. 16, 1999, vol. 1, No. 1, pp. 63-66 (with translation).

Supplementary European Search Report, Application No. EP02804680, dated Apr. 17, 2008, the corresponding set of claims/application has not been identified.

"Interface Technology Coming Close to Real World: Digital Pets—Machines with Minds", Information Processing Society of Japan Magazine, Feb. 15, 2000, pp. 127-136, vol. 41, No. 2, Information Processing Society of Japan, partial translation.

Naoko Umeki et al., "A motional interface by using Motion Processor", Human Interface Society Technical Reports, Feb. 16, 1999, pp. 63-66, vol. 1, No. 1, Information Processing Society of Japan, partial translation.

* cited by examiner

METHODS AND APPARATUS FOR PROVIDING HAPTIC FEEDBACK IN INTERACTING WITH VIRTUAL PETS

CROSS-REFERENCES TO RELATED APPLICATIONS

The present application claims benefit of Provisional Patent Application No. 60/336,411, entitled "Using Haptic Feedback Peripheral Devices to Enhance Interaction with Computer Simulated Pets," filed on Oct. 30, 2001, which is incorporated herein by reference.

BACKGROUND

This invention relates generally to haptic systems, and more particularly, to interactive simulations and interface devices that incorporate haptic feedback.

The advent of Internet and modem communication networks has brought a renewed life to simulated (or "virtual") pets. In addition to stand-alone electronic pet toys (e.g., those known as "Tomagotcchi," see U.S. Pat. No. 5,966,526 for example), a user nowadays can also create his/her own simulated (or "virtual") pet, or order a virtual pet online, and rear the pet in a manner as he/she desires. Such virtual pets are typically programmed to adapt to their environments, and develop new traits and characteristics based upon their interactions with the owners. A virtual pet may further explore the online world, and participate in events as arranged by its owner, and so on. In such scenarios, however, the interaction between a virtual pet and its owner is limited to visual and/or auditory interaction. That is, the user misses a sense of touch with his/her pet, as experienced in the real world.

BRIEF SUMMARY OF THE INVENTION

Embodiments of the invention relate to methods and systems for providing haptic feedback to a user interacting with a simulated (or "virtual") pet, so as to enhance the realism of the user's relationship with the virtual pet. The term "virtual pet" as used herein is construed broadly to refer to any simulated creature or character, which may or may not have a "real-life" counterpart.

In one embodiment, a method of providing haptic feedback to a user interacting with a virtual pet comprises: receiving a signal relating to a biological status of the virtual pet, and outputting, to the user, a haptic effect based on the received signal.

A further understanding of the invention will become apparent by reference to the remaining portions of the specification and drawings.

DETAILED DESCRIPTION OF THE INVENTION

In one embodiment, a method of providing haptic feedback to a user interacting with a virtual pet comprises: receiving a signal relating to a biological status of the virtual pet, and outputting, to the user, a haptic effect based on the received signal.

As used herein, the term "biological status" is construed broadly to refer to a "state of being" of a virtual pet, such as for example a health or emotional state. Examples of the biological status include, but are not limited to: heartbeat, vitality, purring, giggling, being affectionate, and other personal traits. Such states of being are conveyed to a user by way of haptic effects generated based on the biological status of the virtual pet. The user may also experience responses related to feeding and other interactions with the virtual pet by way of appropriate haptic effects.

The software application for controlling a virtual pet may be located on a local device (e.g., a computer or a hand-held device), where the signal relating to the biological status and associated haptic effect are determined at the local device. Alternatively, the software application for controlling a virtual pet may reside remotely, e.g., on a network resource, where the signal relating to the biological status along with associated haptic effect may be generated within the network and sent to a local device for interaction with the user.

In another embodiment, a haptic system that provides haptic feedback to a user interacting with a virtual pet comprises: a user-interface object; a haptic feedback assembly coupled to the user-interface object; a controller in communication with the user-interface object and the haptic feedback assembly; and a memory storing a software. The controller executes the software so as to practice the above method, and the haptic feedback assembly is configured to output the haptic effect thus generated on the user-interface object. In another embodiment, the haptic system further comprises a display screen for displaying a visual image of the virtual pet. It may additionally include an audio element for providing an audio cue associated with the biological status of the virtual pet. Such visual and audio effects may be produced and coordinated in a manner that complements the haptic sensation experienced by the user.

The haptic system described above may be embodied in a computer, a cell phone, a personal digital assistant (PDA), a pager, a game console, a stand-alone toy device (e.g., Tomagotcchi), or other types of hand-held electronic devices known in the art, which may be further equipped with network capabilities.

Figure 1:
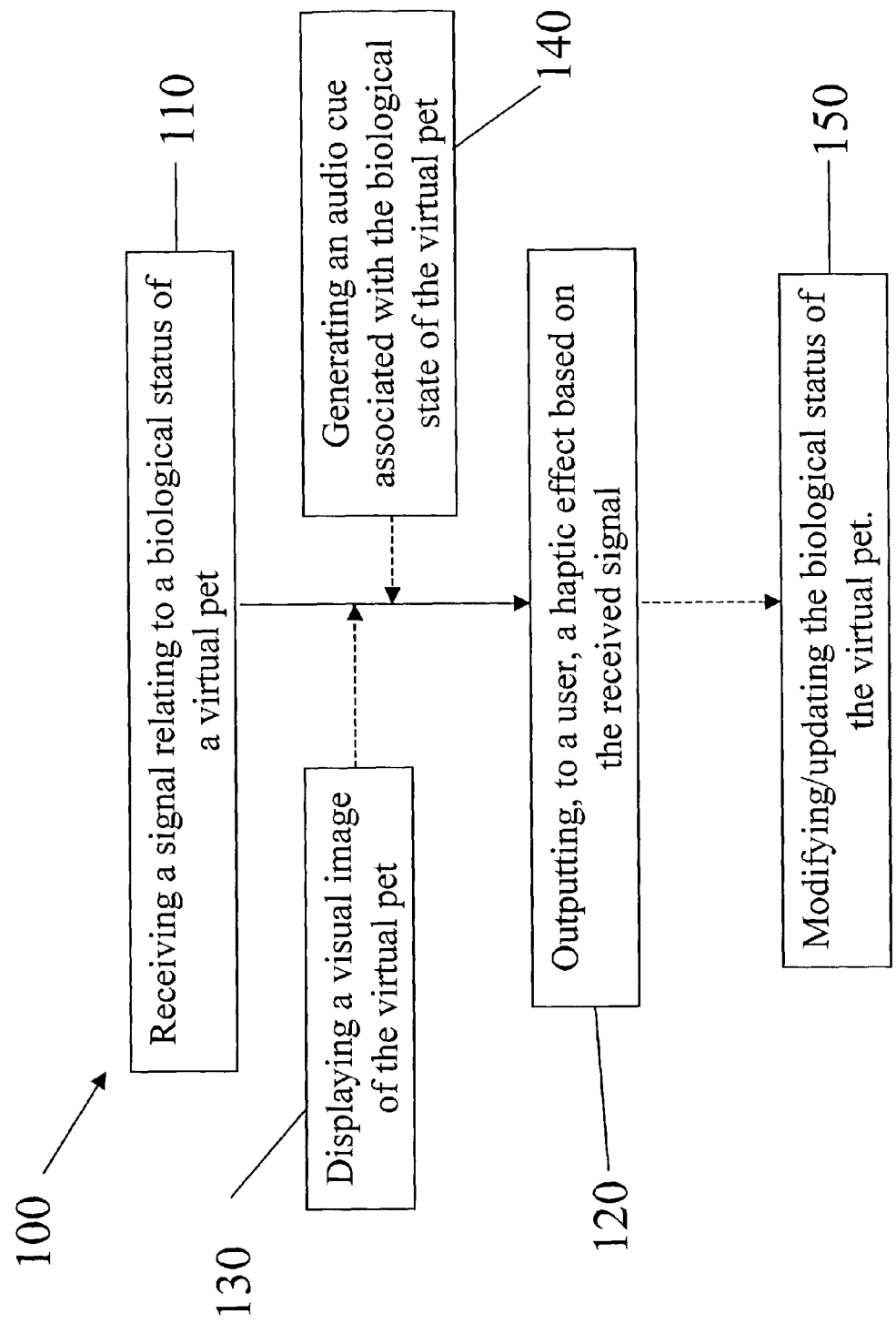
FIG. 1 illustrates a flowchart depicting an embodiment of a method of the invention.

FIG. 1 shows a flowchart 100 depicting a method of providing haptic feedback to a user interacting with a virtual pet, according to an embodiment of the invention. It will be appreciated that the embodiment of FIG. 1 is provided by way of example to illustrate the principles of the invention, and should not be construed as limiting the scope of the invention in any manner. One skilled in the art would also recognize that various changes and modifications can be made herein, without departing from the principles and scope of the invention.

The flowchart 100 of FIG. 1 comprises receiving a signal relating to a biological status of a virtual pet, as recited in step 110; and outputting, to a user, a haptic effect based on the received signal, as recited in step 120.

In step 110 of FIG. 1, the term "receiving" is defined broadly to refer to receiving a signal relating to a biological status of the virtual pet from (or within) a local device; or receiving a signal relating to a biological status of the virtual pet from an outside (or "remote") source, such as a network resource. The former pertains to a situation where the software application for controlling the virtual pet is located on a local device (such as a computer or a hand-held device), as described in further detail in FIG. 2 below. In this situation, the signal relating to the biological status can be received, for example, by an actuator from a controller located within the local device. The latter pertains to a situation where the software application for controlling the virtual pet is remotely located on a network resource, where information related to the virtual pet is transmitted to a local device in contact with the user, as further depicted in FIG. 3. In this situation, the signal relating to the biological status be received from the network, for example, by an actuator located within the local device.

The term "biological status" refers to a "state of being" (or behavior) of the virtual pet, such as a health or emotional state. Examples of the biological status include, but are not limited to: heartbeat, vitality, purring, giggling, being affectionate, and other personal traits.

In step 120 of FIG. 1, a haptic effect is generated based on the received signal relating to the biological status of the virtual pet, and output to the user. The determination of the haptic effect may likewise be performed with a local device (such as a computer or a hand-held device). The determination of the haptic effect may also be performed within a network resource coupled to the local device; a signal or indication based on the determination of the haptic effect can be transmitted to the local device, which can output it to the user. The haptic effect thus generated serves to convey to the user a tactile or kinesthetic feedback associated with the biological state, hence enhancing the realism of the user-pet interaction. The user may also experience responses related to feeding and other interactions with the pet by way of appropriate haptic effects thus generated.

Further, the term "haptic effect" should be construed broadly as encompassing any type of force feedback, such as tactile or kinesthetic feedback, that is deemed appropriate for conveying a particular biological status of the virtual pet and thereby enhancing the realism of the user-pet interaction. See FIG. 4 for further detail.

The embodiment of FIG. 1 may further comprise displaying a virtual image of the virtual pet, as recited in step 130. It may also include generating an audio cue associated with the biological status of the virtual pet, as recited in step 140. Such visual and audio effects may be coordinated such to complement the haptic sensation experienced by the user.

The embodiment of FIG. 1 may additionally include modifying/updating the biological status of the virtual pet, as recited in step 150. As a way of example, upon experiencing the haptic sensation related to a biological status (e.g., feeling lonely or hungry) of the virtual pet, the user may take action (e.g., touching or feeding the pet), which alters the biological status of the pet (e.g., purring or giggling).

The ensuing description discloses several embodiments, illustrating by way of example how the embodiment of FIG. 1 may be implemented. It will be appreciated that there are many alternative ways of practicing the present invention. Accordingly, various changes and modifications may be made herein, without departing from the principles and scope of the invention.

Figure 2:
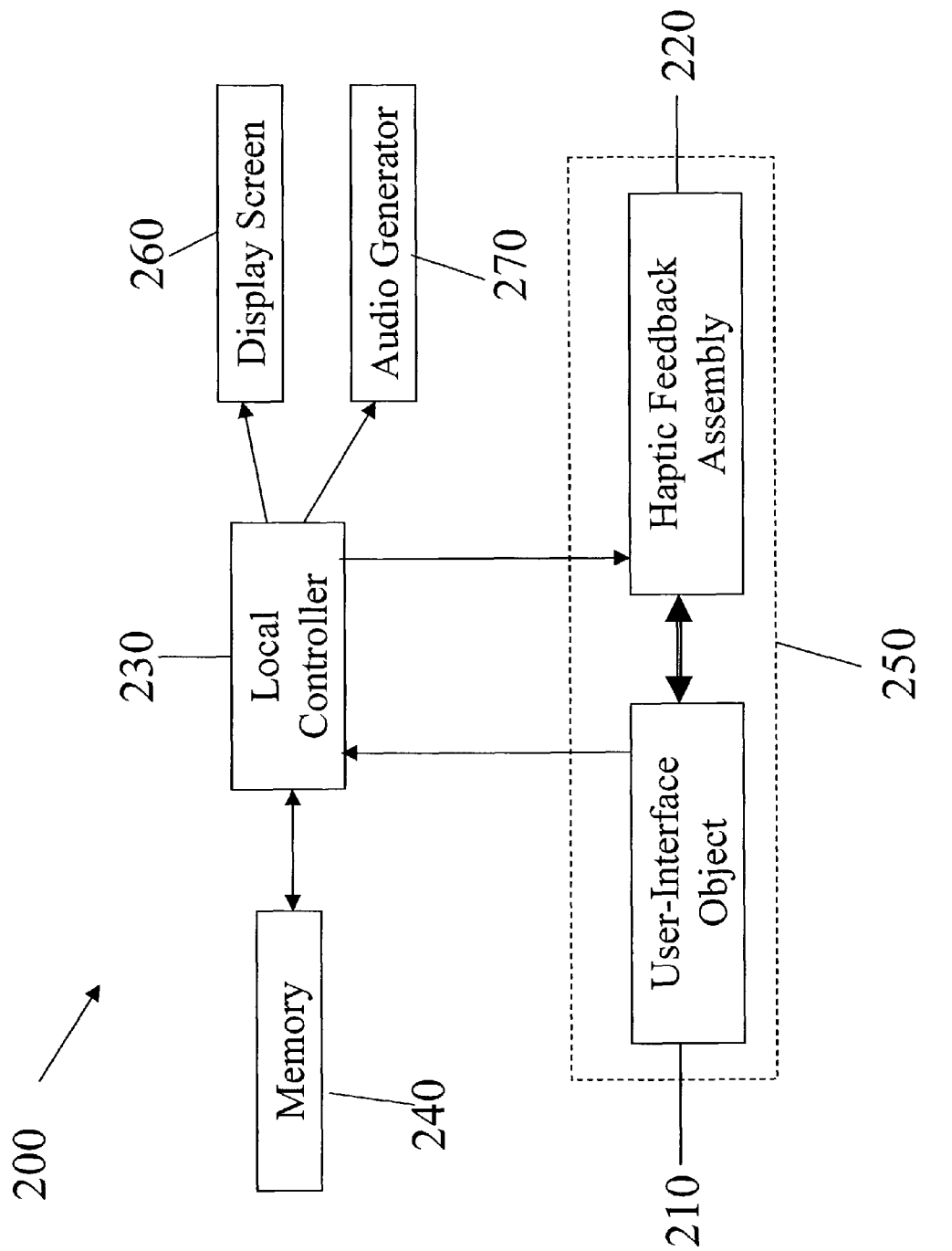
FIG. 2 shows a block diagram of an embodiment of a haptic system of the invention.

FIG. 2 depicts a block diagram of a haptic system 200, which may be utilized to provide haptic feedback to a user interacting with a virtual pet, according to an embodiment of the invention. As a way of example, the haptic system 200 may include a user-interface object 210, a haptic feedback assembly 220, a local controller 230, and memory 240 storing computer-executable software to be executed by the controller 230. The haptic feedback assembly 220 is configured to provide haptic feedback to the user-interface object 210. For instance, the haptic feedback assembly 220 may be mechanically integrated with the user-interface object 210 to form a "haptic-enabled" unitary device 250, as described in further detail with respect to FIG. 4. Alternatively, the haptic feedback assembly 220 can be mechanically engaged with the user-interface object 210 in a manner that effectively transmits the force feedback. The haptic feedback assembly 220 and the user-interface object 210 are further in communication with the controller 230, via for example a wired or wireless communication means known in the art.

In the embodiment of FIG. 2, the computer-executable software stored in the memory 240 causes the local controller 230 to perform tasks when executing the software. More specifically, the computer-executable software causes the local controller 230 to receive an indicator or signal associated with a biological status of the virtual pet, which may be prompted by an input signal from the user-interface object 210. The computer-executable software further causes the local controller 230 to generate an indicator or signal associated with a haptic effect based on the received indicator or signal associated with the biological status. The generated indicator or signal associated with the haptic effect causes the haptic feedback assembly 220 to output the haptic effect to the user. The biological status and/or the corresponding haptic effect may be selected, for example, from a database (e.g., stored in the memory 240), or generated in a dynamic manner.

The haptic system 200 of FIG. 2 can optionally include a display screen 260, in communication with the controller 230, for displaying a visual image of the virtual pet. The haptic system 200 can optionally include an audio element 270, in communication with the controller 230, for providing an audio cue associated with the biological status of the virtue pet. The software for generating such visual and/or audio signals may be stored in the memory 240 and executable by the controller 230. As will be appreciated by those skilled in the art, the visual, audio, and haptic effects as described may be produced and coordinated by the controller 230 in a manner that best enhances the realism of the user's interaction with the virtual pet.

Figure 3:
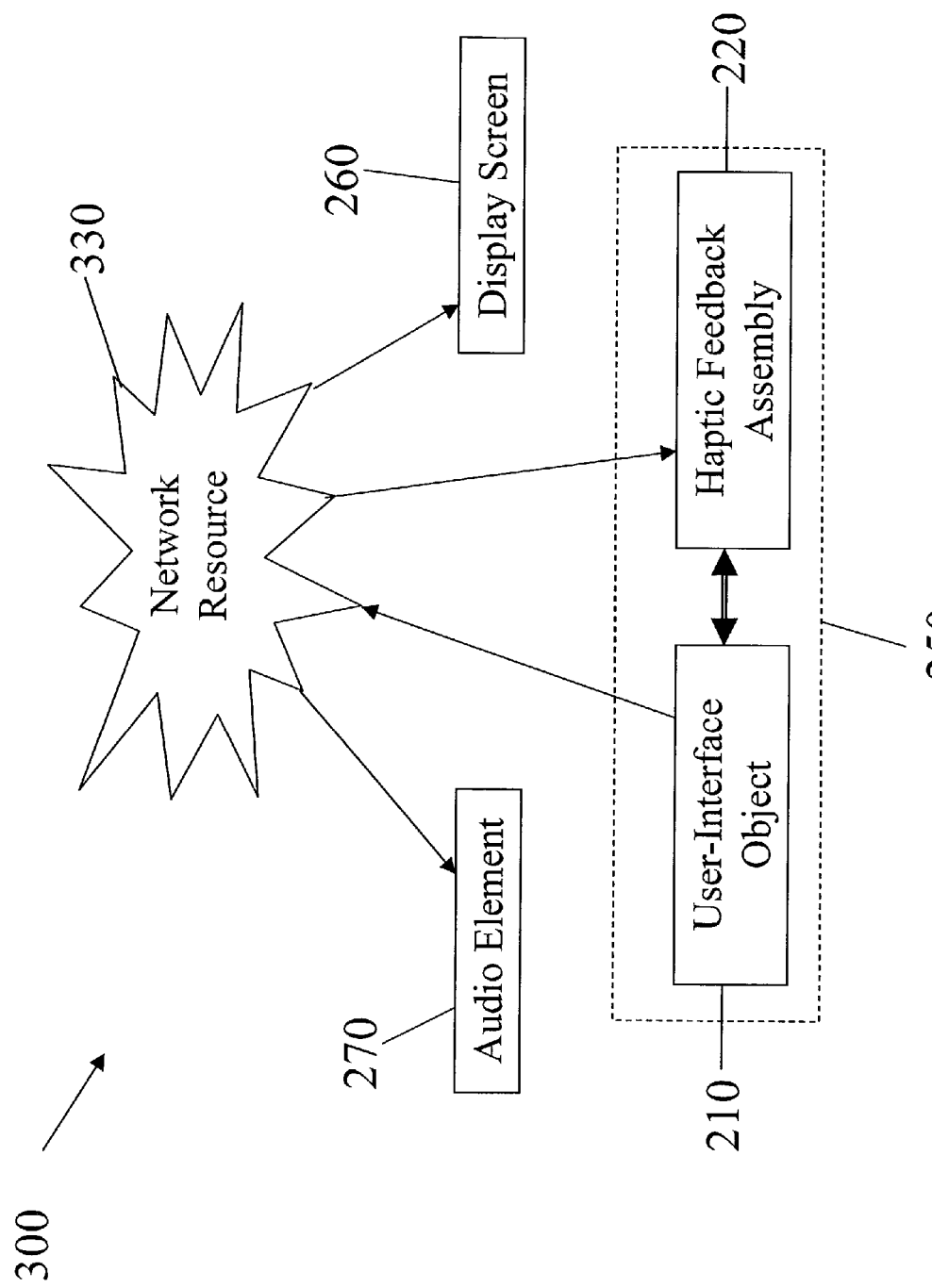
FIG. 3 depicts a block diagram of an alternative embodiment of a haptic system of the invention.

Situations may exist where software application controlling the virtual pet is located on a remote source such as for example a network resource, and an indicator or signal associated with the biological status and an indicator or signal associated with the corresponding haptic effect are sent (or downloaded) from the network resource to the haptic feedback assembly in a local device configured to be in contact with the user. FIG. 3 depicts a haptic system 300 pertaining to this scenario, according to an embodiment of the invention. By way of example, the embodiment of FIG. 3 may be based upon the embodiment of FIG. 2, hence has like elements labeled with similar numerals. In this case, a network resource 330 may be utilized, in lieu (or in conjunction with) the local controller 230 and the memory 240 in the embodiment of FIG. 2.

In FIG. 3, the network resource 330 (e.g., a network server) may include for example a suitable controller and software executable by the controller (along with an appropriate database). Network resource 330 can operate in a manner similar to those described above with respect to FIG. 2. The network resource 330 may determine a biological status of the virtual pet, which may be prompted for example by an input signal from the user-interface object 210. The network resource 330 can generate an indicator or signal associated with the determined biological status. The network resource 330 may further generate an indicator or signal associated with a haptic effect based on the biological status thus determined. The network resource 330 can send the indicator or signal associated with the haptic effect to the haptic feedback assembly 220 to output the haptic effect to the user-interface object 210. The network resource 330 may also provide an indicator or signal associated with a visual image of the virtual pet. Such an indicator or signal associated with a visual image of the virtual pet can be transmitted and displayed on the display screen 260. In addition, the network resource 330 may generate an audio signal associated with the biological status of the virtual pet and transmit the audio signal to the audio element 270. As described above with respect to FIG. 2, such visual and audio cues may be coordinated in a manner that best complements the haptic sensation experienced by the user.

The haptic system 200 of FIG. 2 (or 3) may be embodied for example in a personal computer (such as desktop or laptop), a work station, a kiosk, or one of a variety of home video game console systems commonly connected to a television set or other display screen. The user-interface object 210 may be for example a mouse, joystick, keyboard, touchpad, direction pad, gamepad, trackball, remote control, or other types of user-interface input devices known in the art. The user may interact with the virtual pet (e.g., touching) by way of manipulating a cursor on the display screen 260 (e.g., a monitor), for instance. The memory 240 includes, but is not limited to: random access memory (RAM), read-only memory (ROM), hard drives, DVD drives, CD-R/RW drive, floppy diskettes, photomagnetoelectric disks, magnetic tapes, or other data storage medium known in the art. The controller 230 (e.g., one or more processors in a computer) may be further equipped with a networking capability (e.g., being able to be connected to the Internet), so as to enable the user and virtual pet to explore the World Wide Web, for instance.

The haptic system 200 of FIG. 2 (or 3) may also be embodied in a hand-held device, such as a cell phone, PDA, pager, a self-contained electronic toy such as "Tomagotchi", a hand-held video game unit (e.g., Nintendo Gameboy), and the like. The user-interface object may be provided by one or more physical (or soft) keys, scrollwheels, switches, or other types of user-interface input devices. One skilled in the art will recognize in some of these devices, a touch screen may be employed to serve as both a user-interface input device and a display means.

Figure 4:
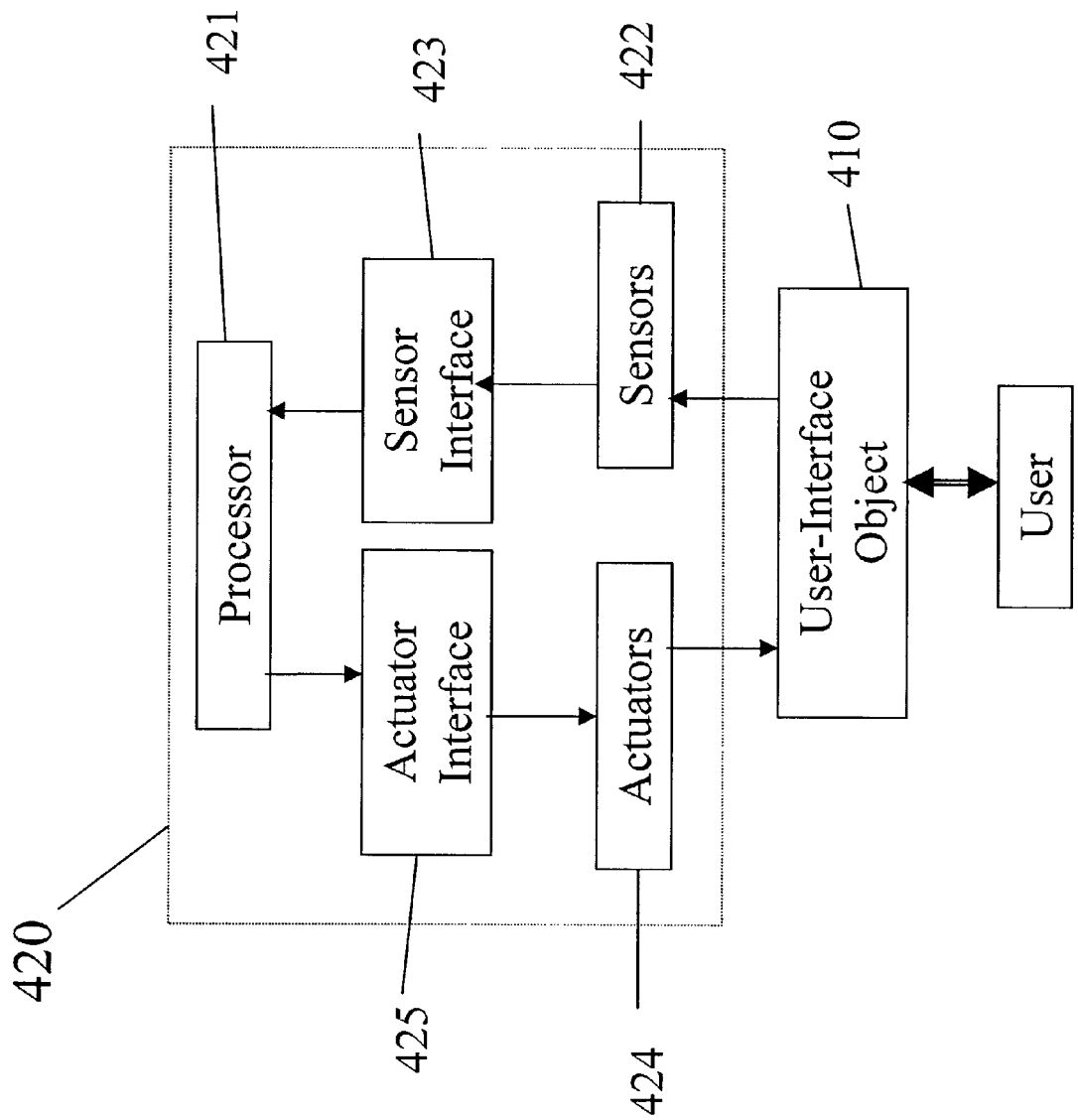
FIG. 4 shows a block diagram of an embodiment of a haptic feedback assembly of the invention.

FIG. 4 shows a block diagram of an exemplary embodiment 420 of a haptic feedback assembly, which may be used to configure the haptic feedback assembly 220 of FIG. 2 (or 3). The haptic feedback assembly 420 may generally include a processor 421, one or more sensors 422 along with associated sensor interface 423 for detecting the motion of a user-interface object 410, and one or more actuators 424 along with associated actuator interface 425 for outputting forces on a user-interface object 410. The processor 421 may use the output from the sensors to control the actuators, so as to exert appropriate forces on the user-interface object 410 in accordance with its motion. The configuration and operation of such a haptic feedback assembly are described in greater detail in U.S. Pat. Nos. 5,734,373, 6,285,351, and 6,300,936, which are incorporated herein by reference.

As described above, the haptic feedback assembly 420 and the user-interface object 410 may be mechanically integrated to form a "haptic-enabled" unitary device, such as the iFeel mouse manufactured by Logitech, Inc., and enabled by the TouchSense™ technology of Immersion Corporation. In one embodiment, such a mouse may be interfaced to a computer running a virtual pet software (e.g., an Internet-based virtual pet software from Neopets.com). Such software enables users to create their own pets, which may be selected from many different types and with a wide variety of characteristics. U.S. Pat. Nos. 6,211,861 and 6,429,846, for instance, disclose embodiments on "haptic-enabled" user-interface input devices, which are incorporated herein by reference.

Further, the haptic feedback assembly 420 may be configured to output any form of force feedback as deemed suitable. In some applications, for instance, it may be desirable to effect tactile sensations, such as vibrations, pulses, and textures, on a user. Whereas in other applications, kinesthetic sensations may be produced in the degrees of freedom of motion of the user-manipulatable object (e.g., a joystick handle, mouse, steering wheel, etc.), so as to provide more dynamic interactions between the user and virtual pet. U.S. Pat. No. 5,734,373 discloses embodiments on generating tactile and kinesthetic feedback, which is incorporated herein by reference.

Optionally, embodiments of the invention may further allow the user to select or customize the haptic feedback that corresponds to a particular status of the virtual pet.

The ensuing description discloses embodiments on producing haptic sensations associated with various biological states of a virtual pet.

Purring

Figure 5:
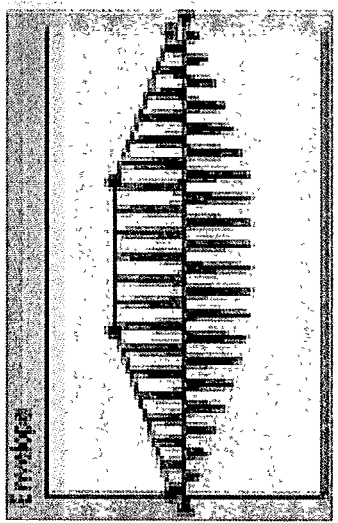
FIG. 5 illustrates an embodiment of a single purring waveform.

When a user, interacting with a virtual pet, takes an action that makes the pet happy, a haptic effect that simulates a purring sensation may be output to the user by a haptic feedback assembly (e.g., the haptic feedback assembly 220 described above). The purring sensation may be triggered in response to the user "petting" the virtual pet with a cursor on the display screen (such as the display screen 260 of FIG. 2 or 3), e.g., by moving the cursor back and forth over the image of the displayed pet, or simply by actuating a petting button (e.g., an icon on the display screen, or a button on the user-interface object device 210 of FIG. 2 or 3). The purring sensation may be delivered to the user, when the user engages or contacts a pet with a cursor during a predetermined period of time, thereby simulating the physical experience of a cat that purrs when being petted and happy, for instance. Such purring sensation may be delivered in the form of a periodic vibration by the haptic feedback assembly. The magnitude and/or frequency of the purring vibration may vary with time, e.g., depending upon the user interaction. As a way of example, FIG. 5 shows an example of a waveform that may be used for generating a purring vibration, where the magnitude ramps and declines over a period of time. Such a purring waveform may be further repeated over time, so as to provide a sequence of purring vibrations as depicted in FIG. 6.

Figure 6:
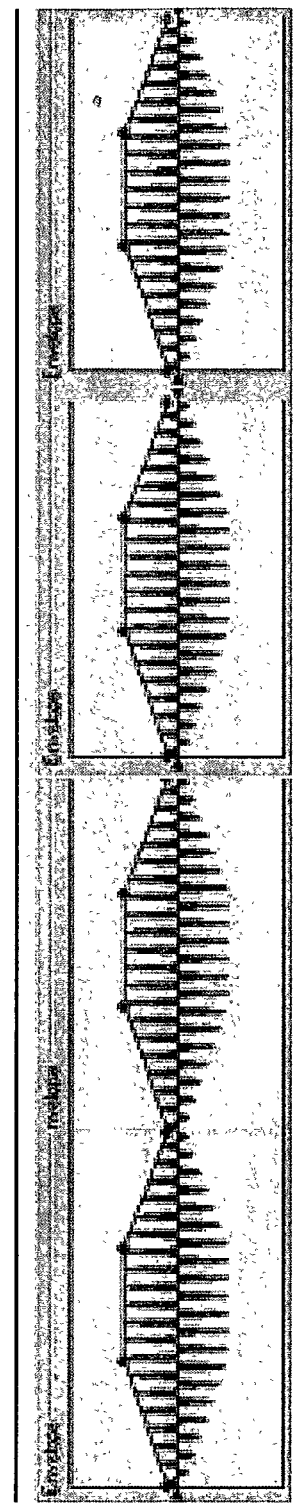
FIG. 6 shows an embodiment of a continuous purring waveform.

In some embodiments, the vibration cycles in FIG. 6 may also have different characteristics (e.g., magnitudes and/or frequencies). For instance, when a user is petting a virtual pet over an extended period of time, the magnitude (and optionally the frequency) may progressively increase.

Heart Beat

In some embodiments, a user may check the heartbeat of his/her virtual pet as a way of checking the health condition of the pet. The user may enter an input signal to prompt the heartbeat "measure" via a user-interface input device (e.g., the user-interface object 210 described above). Consequently, a data signal or indicator may be transmitted to the haptic feedback assembly that outputs a pulsing sensation to the user. The rate or magnitude of the pulsing sensation may be used to indicate the health state of the virtual pet: for instance, a slow (low frequency) and/or weak (low magnitude) pulse may signal an unhealthy pet that needs care.

Figure 7:
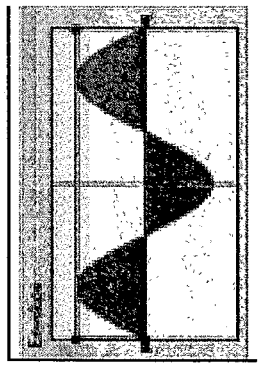
FIG. 7 depicts an embodiment of a "healthy" heartbeat waveform.
Figure 8:
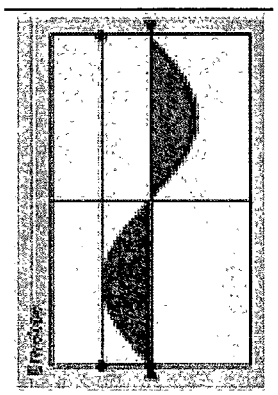
FIG. 8 shows an embodiment of a "weakened-health" heartbeat waveform.
Figure 9:
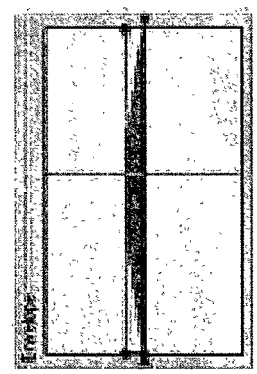
FIG. 9 illustrates an embodiment of a "near-death" heartbeat waveform.

FIGS. 7, 8 and 9 depict several waveforms that may be used for generating pulsing sensations related to different health conditions of a virtual pet. By way of example, FIG. 7 shows an example of a waveform for a relatively "healthy" heartbeat, indicating that the virtual pet is in good health. This waveform causes the output of a relatively high frequency and high magnitude pulsing sensation. FIG. 8 shows an alternative waveform for a weakened health heartbeat, which is lower in magnitude and frequency than that shown in FIG. 7. This sensation informs the user the deterioration in the pet's health. FIG. 9 shows another waveform for a "near-death" heartbeat, signaling the grave condition of the virtual pet. It will be appreciated that this waveform is in notable contrast with that illustrated in FIG. 7.

Figure 10:
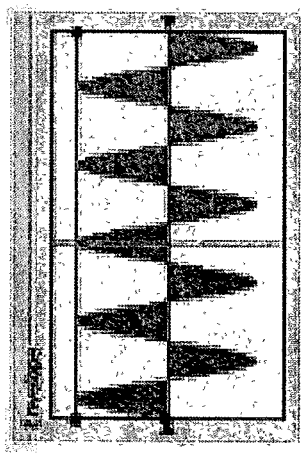
FIG. 10 depicts an embodiment of an "excited" heartbeat waveform.

In addition to health, the heartbeat may be used to indicate a state of "exertion" or "excitement" of the virtual pet, e.g., a rapid heartbeat may convey such a state to the user. By way of example, FIG. 10 depicts an example of a waveform for an "excited" heartbeat. Such a waveform may also be output, for example, when the user visits the virtual pet after a long period of absence, or when the user rewards the virtual pet, etc. In alternative embodiments, a heartbeat of exertion (e.g., as a result of battling other virtual pets, or walking in a virtual world, etc.) may be indicated by a waveform with gradually reduced magnitude and/or frequency.

Giggle

Figure 11:
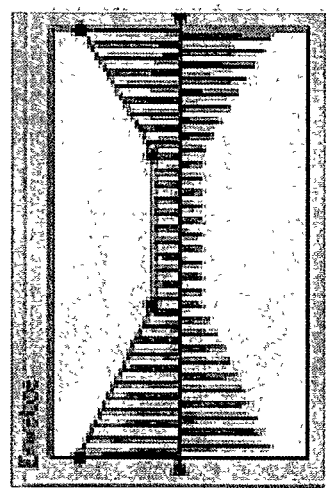
FIG. 11 shows an embodiment of a giggling sensation waveform.

When a user interacts with a virtual pet in a manner that "tickles" the pet, a giggling sensation may be delivered to the user by way of the haptic feedback assembly. For example, the user may move a cursor back and forth over the image of the virtual pet to mimic the action of tickling. As a result, a giggling sensation may be delivered to the user as a vibration sensation with varying magnitude and frequency. By way of example, FIG. 11 displays an example of a waveform that may be used to effect a giggling sensation. In this example, the amplitude of the high-frequency sinusoid wave exhibits a modulated "envelope," which is shown to start at a high level, ramp down to a lower level, and then ramp back up, and so on. This provides a high-frequency pulsing that varies in magnitude over time. As described above, appropriate visual and audio effects corresponding to the tickling action may also be produced, to complement the giggling sensation.

Feeding

In caring for a virtual (or real) pet, a routine activity is "feeding" the pet. When a virtual pet is eating, a tactile feedback may be output to the user to effect a "feeding sensation." Such a feeding sensation may be in the form of a series of jolts, indicating that the pet is gulping down food, for instance. Alternatively, the feeding sensation may be delivered to the user as a continuous vibration, indicating that the pet is drinking liquid, or chewing vigorously. The feeding sensation may be also be delivered in coordination with visual images of the pet moving its mouth in chewing or gulping motion, along with corresponding sound effects.

It will be appreciated that haptic effects may be further devised to convey other characteristics and abilities of a virtual pet. For example, a tactile sensation may be delivered to the user to signal a virtual pet wagging its tail, where the magnitude and frequency of the vibration may be correlated with the graphical image of wagging. Appropriate haptic sensations may also be generated, corresponding to a virtual pet wagging its ears, panting, scratching fur or flea bites, stretching, or sleeping. In addition, a virtual pet may be equipped with an extraordinary power, such as the ability to shoot lightening bolts or breathe fire. An appropriate haptic sensation may be devised to convey such power, as well.

Feeling the Statistics

In a virtual pet environment, a pet is often given a set of statistics that document the strength and vitality of the creature. Such statistics may be used when two pets "do battle." For instance, when one pet owner is trying to decide if his/her pet should battle another pet, he/she may check the strength statistics related to both pets. An effective way of getting a sense of the "strength" of a potential opponent is by way of haptic sensation. As a way of example, a user may put a cursor over the image of a particular pet and feel a haptic sensation that conveys the strength of the pet. The haptic sensation in this case may be delivered in the form of a vibration, characterized by a magnitude that is scaled in accordance with the pet's strength statistics, for instance.

Likewise, virtual pets may be characterized by "popularity" statistics. As in the case of the strength (or vitality) statistics, a haptic sensation may be associated with a popularity statistic. For example, an "unpopular" pet may be assigned with a soft, low frequency tactile sensation; whereas a popular pet may dictate a strong, high frequency tactile sensation. Those skilled in the art will appreciate that haptic sensations may likewise be associated with other statistics of virtual pets.

Those skilled in the art will recognize that the embodiments described above are provided by way of example, to elucidate the general principles of the invention. Various means and methods can be devised to perform the designated functions in an equivalent manner. Moreover, various changes, substitutions, and alternations can be made herein without departing from the principles and the scope of the invention.

What is claimed is:

1. A non-transitory computer-readable medium having computer-executable software code that when executed causes a computer to perform a method comprising:
   storing a health state of a virtual pet that defines a health of the virtual pet;
   receiving a signal representing the health state of the virtual pet, the health state having an associated haptic effect;
   outputting, to a user via an actuator, the associated haptic effect based on the received signal, wherein the haptic effect is a vibration having a magnitude component and a frequency component comprising magnitude and frequency values that are scaled in accordance with the health state of the virtual pet;

selecting whether to customize the haptic effect or maintain the haptic effect;
upon selecting to customize, customizing at least one from a group comprising the frequency component, the magnitude component, or an envelope of a waveform of the haptic effect, where the customizing is responsive to at least one set of output effects associated with the virtual pet, the at least one set of output effects comprising output haptic effects and at least one of output audio effects or output visual effects;
generating a visual image of the virtual pet on a display, wherein the visual image is coordinated to correspond to the associated haptic effect;
detecting a movement of a cursor over the visual image of the virtual pet for a predetermined period of time; and
outputting to the user, via the actuator, a periodic vibration having a magnitude component and a frequency component that vary over a period of time.

2. The non-transitory computer-readable medium of claim 1, wherein the code to receive includes code to receive locally the signal resenting the health state.

3. The non-transitory computer-readable medium of claim 1, wherein the code to receive includes code to receive the signal representing the health state from a remote network source.

4. The non-transitory computer-readable medium of claim 1, the method further comprising:
obtaining locally an indicator associated with the haptic effect based on the signal representing the health state of the virtual pet.

5. The non-transitory computer-readable medium of claim 1, the method further comprising:
obtaining, at a remote network source, an indicator associated with the haptic effect based on the signal representing the health state; and
sending the indicator associated with the haptic effect from the remote network source to a local processor.

6. The non-transitory computer-readable medium of claim 1, wherein the signal further represents an emotional state of said virtual pet.

7. The non-transitory computer-readable medium of claim 1, the method further comprising: generating an audio cue associated with the health state of said virtual pet.

8. The non-transitory computer-readable medium of claim 1, the method further comprising:
storing a set of strength statistics that define a strength of the virtual pet;
receiving a signal representing the set of strength statistics of the virtual pet, the set of strength statistics having a haptic effect associated therewith; and
outputting to a user via an actuator, the associated haptic effect based on said received signal, wherein the haptic effect is a vibration having a magnitude component and a frequency component wherein magnitude and frequency values associated with said magnitude and frequency components are scaled in accordance with the set of strength statistics of the virtual pet.

9. An apparatus, comprising:
a user-interface object;
a display;
a haptic feedback assembly coupled to the user-interface object, the haptic feedback assembly configured to output a haptic effect to said user-interface object; and
a memory coupled to the user-interface object and to the haptic feedback assembly, the memory storing a machine-executable software program of instructions that when executed by a machine is configured to:
cause the machine to store a health state of a virtual pet that defines a health of the virtual pet;
cause the machine to receive a signal representing the health state of the virtual pet, the health state having an associated haptic effect;
cause the machine to output the associated haptic effect to the haptic feedback assembly in response to the received signal wherein the haptic effect is a vibration having a magnitude component and a frequency component comprising magnitude and frequency values that are scaled in accordance with the health state of the virtual pet;
cause the machine to select whether to customize the haptic effect or maintain the haptic effect;
upon causing the machine to select to customize, cause the machine to customize at least one from a group comprising the frequency component, the magnitude component, or an envelope of a waveform of the haptic effect, where the customizing is responsive to at least one set of output effects associated with the virtual pet, the at least one set of output effects comprising output haptic effects and at least one of output audio effects or output visual effects;
cause the machine to generate a visual image of the virtual pet on the display, wherein the visual image is coordinated to correspond to the associated haptic effect;
cause the machine to detect a movement of a cursor over the visual image of the virtual pet for a predetermined period of time; and
cause the machine to output to the user, via the actuator, a periodic vibration having a magnitude component and a frequency component that vary over a period of time.

10. The apparatus of claim 9, further comprising a controller coupled to said user interface object and said haptic feedback assembly, said controller executing said machine-executable software program.

11. The apparatus of claim 10, wherein said user-interface object includes an element selected from the group consisting of a mouse, a joystick, a keyboard, a trackball, a scroll wheel, a touch pad, a touch screen, a stylus, a remote control and a game pad.

12. The apparatus of claim 9, wherein said user-interface object includes a touch screen.

13. The apparatus of claim 12, wherein said instructions stored in said memory further includes instructions to display said virtual pet on said touch screen, and instructions to receive a user signal from said touch screen, the haptic effect being based on the user signal.

14. The apparatus of claim 9, wherein the signal further represents an emotional state of said virtual pet.

15. The apparatus of claim 9, wherein said instructions stored in said memory further includes instructions to:
cause the machine to store a set of strength statistics that define a strength of the virtual pet;
cause the machine to receive a signal representing the set of strength statistics of the virtual pet, the set of strength statistics having a haptic effect associated therewith; and
cause the machine to output to a user via an actuator, the associated haptic effect based on said received signal, wherein the haptic effect is a vibration having a magnitude component and a frequency component wherein magnitude and frequency values associated with said magnitude and frequency components are scaled in accordance with the set of strength statistics of the virtual pet.

16. A method, comprising:
storing a health state of a virtual pet that defines a health of the virtual pet;

receiving a signal representing the health state of the virtual pet, the health state having an associated haptic effect;

outputting, to a user via an actuator, the associated haptic effect based on the received signal, wherein the haptic effect is a vibration having a magnitude component and a frequency component comprising magnitude and frequency values that are scaled in accordance with the health state of the virtual pet;

selecting whether to customize the haptic effect or maintain the haptic effect;

upon selecting to customize, customizing at least one from a group comprising the frequency component, the magnitude component, or an envelope of a waveform of the haptic effect, where the customizing is responsive to at least one set of output effects associated with the virtual pet, the at least one set of output effects comprising output haptic effects and at least one of output audio effects or output visual effects;

wherein, at different times, haptic effects are produced by the actuator to simulate a plurality of the following: a purring haptic sensation, a heartbeat haptic sensation, a giggling haptic sensation, a feeding haptic sensation, and a haptic sensation indicative of a strength statistic used when virtual pets do battle;

generating a visual image of the virtual pet on a display, wherein the visual image is coordinated to correspond to the associated haptic effect;

detecting a movement of a cursor over the visual image of the virtual pet for a predetermined period of time; and outputting to the user, via the actuator, a periodic vibration having a magnitude component and a frequency component that vary over a period of time.

* * * * *